United States Patent
Chartet

[15] 3,667,111
[45] June 6, 1972

[54] PROCESS FOR FLUXING AND BRAZING PARTS MADE OF ALUMINIUM OR ALUMINIUM ALLOY

[72] Inventor: Andre Chartet, Meudon, France
[73] Assignee: Societe Anonyme Des Usines Chausson, Asnieres, France
[22] Filed: Mar. 2, 1970
[21] Appl. No.: 15,601

[30] Foreign Application Priority Data

Mar. 5, 1969 France.....................6906108
Sept. 12, 1969 France.....................6931230

[52] U.S. Cl..............................29/495, 29/496, 117/105.2
[51] Int. Cl. ................................B23k 31/02, B23k 35/36
[58] Field of Search .................29/495, 496; 148/23, 24, 26; 117/105.1, 105.2

[56] References Cited

UNITED STATES PATENTS

| | | | |
|---|---|---|---|
| 2,179,258 | 11/1939 | Howarth | 148/26 |
| 2,723,929 | 11/1955 | Wagner et al. | 148/26 |
| 2,756,497 | 7/1956 | Gale | 29/495 |
| 2,817,893 | 12/1957 | Cunningham et al. | 29/495 X |
| 3,330,028 | 7/1967 | Elbreder | 29/495 |
| 3,377,183 | 4/1968 | Hurt, Jr. et al. | 117/21 X |
| 3,573,090 | 3/1971 | Peterson | 117/17 X |

FOREIGN PATENTS OR APPLICATIONS

| | | | |
|---|---|---|---|
| 680,344 | 10/1952 | Great Britain | 148/24 |
| 802,483 | 10/1958 | Great Britain | 29/495 |
| 236,213 | 4/1966 | U.S.S.R. | 29/495 |

Primary Examiner—John F. Campbell
Assistant Examiner—Ronald J. Shore
Attorney—Imirie, Smiley, Snyder and Butrum

[57] ABSTRACT

The process is characterized in that one proceeds to prepare a fluxing compound, in that a thin coat of this compound is deposited on at least those of portions of parts requiring to be assembled, then that after partly melting the compound the parts are heated up to brazing temperature.

6 Claims, 2 Drawing Figures

INVENTOR

ANDRE CHARTET

BY

PROCESS FOR FLUXING AND BRAZING PARTS MADE OF ALUMINIUM OR ALUMINIUM ALLOY

The invention relates to the joining by brazing of parts in aluminum or aluminum alloy and principally to the embodying of cooling radiators for motor vehicles and other similar heat exchangers.

Up till now, for stove brazing parts made of aluminum or aluminum alloys, it has been necessary, first of all, to clean the parts to remove grease, which is generally done by plunging said parts in products such as methyl-ethyl-ketone or other grease-removing products then into pickling baths of other kinds. This procedure, sometimes, requires rinsing said parts in water before they are dried, then to plunge them into a flux bath made by a dispersion-or solution in water, alcohol, a ketone or chlorinated derivatives-of metallic salts occuring as of chlorides or fluorides of aluminum and alkaline metals or complex salts of fluoride and derivatives thereof.

At the exit from the flux bath, the parts to be brazed must be stoved and perfectly dried, so that the salts forming the brazing flux cover all the surfaces of the parts to be brazed which are then conveyed to a pre-heating cell of the oven, then into a terminal heating cell the parts are heated up to the brazing temperature, this temperature exceeding 570° C.

In the case of brazing aluminum parts in a flux bath, then metallic salts and eventually brazing alloys are kept in a melting condition in a crucible and the parts to be brazed are immersed into the melted salts bath. This second method obviously makes possible to eliminate the preliminary fluxing operation, and also the stoving operation, but it is still necessary to clean the parts before dipping them in the bath and generally also to preheat them.

In the stoving brazing process mentioned above, it has been ascertained that for doing a satisfactory brazing, it was necessary either to utilize relatively considerable thicknesses of flux on the parts to be brazed, these thicknesses corresponding to a flux weighing approximately 150 g/m2, or else, in order to reduce the flux thickness and hence the cost of the operation, it appeared necessary to first proceed with the stoving operation eliminating the aqueous support of salts in a prolonged manner by means of gas previously dehydrated, then to proceed with the brazing operation itself in a stoving atmosphere also dehydrated to a very high degree whose dew-point is at least about −50° C, which entails very expensive air distributing equipment.

The invention creates a new fluxing and brazing process by which are eliminated preliminary bath fluxing operations, as well as stoving operation when furnace brazing is put into practice and through that process the greater part of maintaining and renewing the level of the melted salts baths are eliminated when the bath brazing process is utilized.

Moreover, the quantity of fluxing salts to be used is very small as compared with that required up till now, and even less than the small quantities of salts that are used when a furnace brazing process is utilized with atmospheres having a very slight moisture content which were required up till now, and which required an expensive and complex equipment.

According to the invention, a fluxing compound is prepared said flux containing metallic chlorides and fluorides in anhydrous form, and a thin even coating of this compound is deposited on at least the portions of said parts that must be joined together by subjecting this compound to at least a partial melting for a short time, the brazing of said parts being done by subsequent heating up to brazing temperature immediately after depositing said fluxing compound.

According to an important new feature of the invention, one prepares the fluxing compound from a mixture of metallic salts in an anhydrous state, said mixture is then heated to reach at least a pasty state, the salt mixture then is cooled, crushed and sifted so as to make a fine composition powder within the size range of about 25 to 150 $\mu$ and said powder is used for covering the portions of the parts to be brazed by momentarily melting it, at the moment of deposition, on said parts to be brazed.

According to an optional feature of the invention, it also becomes possible to braze parts which have not been covered with a brazing alloy, hence which are not very costly, and this while making a high quality braze and enabling perfectly seal-tight connections.

According to another optional feature of the invention, an anhydrous fluxing compound reduced to powder is prepared, which is deposited in a thin coating on the parts of the pieces that must be assembled together, while submitting this compound to at least partial melting during a short time, said fluxing compound being pressure sprayed on the parts to be covered at the same time as the metal particles of a brazing alloy.

Various other characteristics of the invention will moreover be revealed by the detailed description which follows.

Embodiments of the invention are shown, by way of non-restrictive example, in the accompanying drawings.

Figure 1:
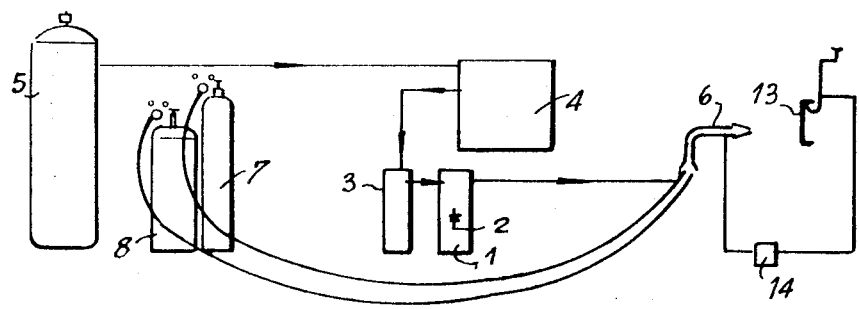
FIG. 1 is a diagram of an installation for putting the process of the invention into practice.

For carrying out the process of the invention covering fluxing and brazing metal parts of aluminum or aluminum alloy, preferably—but not necessarily — covered with brazing alloys, mainly aluminum-silicon alloy containing 2 to 13 percent of silicon, a fluxing compound is first of all prepared which can be made of components which are normally known in commerce for preparing aluminum brazing flux in aqueous vehicles, but according to the invention, the fluxing compound is constantly kept in the anhydrous state.

As constituent of a brazing flux for aluminum, it is known to utilize metal salts, particularly chlorides and fluorides combination, such as lithium chloride, strontium chloride, potassium fluoride, cryolite, sodium chloride, etc..., whose respective quantities can vary within certain limits, determined by the kind of brazing alloy and also the manner in which brazing itself is carried on, e.g., if brazing takes place in the stove, or on the contrary, in a bath. For instance, in the preferred use of the invention for the brazing of parts forming radiator cores, parts made of aluminum plated on at least one face by an aluminum-silicon alloy with a 12 percent silicon content, and when brazing is to be done in the stove, a fluxing compound can be used that consists of:

— 30 parts by weight of lithium chloride
— 35 parts by weight of sodium chloride
— 40 parts by weight of potassium chloride
— 6 parts by weight of zinc chloride
— 12 parts by weight of cryolite
— 9 parts by weight of aluminum fluoride.

The above-mentioned metallic salts respectively have different melting temperatures that extend from about 250° to 1,100° C.

After mixing said metallic salts, it has been noticed that if this mixture is brought to a melting temperature, it is possible to obtain a fluxing compound with a pasty melting limit appreciably extending in a 200° to 600° C. bracket.

According to one operation of the process of the invention, the constituents of the fluxing compound previously mixed carefully in a dry atmosphere receptacle, for instance whose atmosphere has a dew-point of less than −50° C., are brought to a melting state, then cooled to form a solid mass. This mass is then finely ground, still in a dry atmosphere, then sifted to obtain a powder whose even size composition, lies, for instance between 25 and 150 $\mu$.

A following operation of the process consists of depositing the prepared anhydrous flux on portions of the parts to be brazed together, and to do this, the deposition is done at high temperature, i.e., by previously heating either the prepared powdered flux, or the portions of the parts to be covered with a uniform coating. The temperature at which this deposition is carried out is between 200° and 400° C., and the temperature selected in the braket depends on the method of deposition chosen, of which some are given hereafter, and of the nature of the parts to be brazed together, which parts must obviously be free of all dirt, particularly traces of grease, which would risk spoiling the quality of the brazing joints.

For depositing the fluxing composition, several methods can be considered, according to the invention, and in that which follows, although this is not restrictive from the standpoint of the scope of the invention, the preferred application is considered to which it generally applies, i.e., brazing of radiator cores for motor vehicles.

In this case, it was found that the best results, with regard to brazing tubes to secondary heat dissipating elements with which these tubes are associated, i.e., fins or corrugated intercalaries, likewise the brazing of the ends of the tubes to collectors, were obtained by depositing a very thin coat of flux on the entire external surface of said core, this coat being as even as possible with regard to its thickness. By way of example, for subsequently effecting the brazing of the tubes to the dissipating elements with which they are provided, the weight of the brazing compound is of about 10 to 40 g/m2, this weight being able to be still further reduced in certain circumstances, particularly when the oxide coating has been previously reduced, at least partially, by a preliminary pickling treatment which is advantageous to effect, according to the invention, particularly when brazing is done in the oven.

Figure 2:
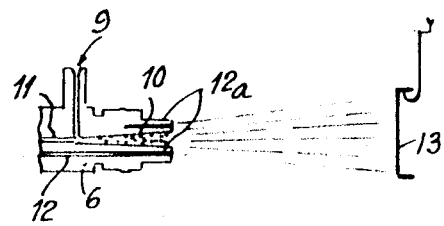
FIG. 2 is a diagrammatical section, on a larger scale, of an embodiment of a spray nozzle appearing in the diagram of FIG. 1.

An advantageous method according to the invention for depositing an even coat of fluxing compound is shown in FIG. 1, in which reference numeral 1 represents a closed dry atmosphere receptacle containing the prepared flux compound powder, this receptacle being provided with an agitator 2, and being connected, by means of purifying device 3 and a flow regulating unit 4, to a source 5 of compressed air, nitrogen or other gas. The gas brought into the receptacle 1 conveys a regular quantity of powder which is then taken to a dissipating member 6, formed, in the example shown, by a spray nozzle fed with combustible mixtures from cylinders 7 and 8 for instance, containing respectively, the one, oxygen, the other ethylene, propane or another combustible product. This blowpipe, one embodiment of which is shown in FIG. 2, has a pipe 9, through which the powder in suspension in the gas coming from the source 5 is brought, this powder conveying pipe 9 emerging at the inlet to a blowing burner 10 into which there also emerges an inlet jet of driving gas which can also come from the source 5, and moreover, the combustible products are conveyed by one or more channels 12, preferably terminating in an annular outlet 12a so that the flame produced is obligatorily traversed by the gas and powder carried along by the gas.

By this means, the powder is brought to the temperature selected which depends on the part to be covered with the fluxing compound. Said part is designated by 13 in FIG. 1, and is placed in the trajectory of the jet coming from the spray nozzle 6. The part 13 can either be at the surrounding temperature, or pre-heated, but according to the invention, it has been seen that the best results were obtained when the fluxing compound is sprayed on, and the part 13 is at ambient temperature or thereabouts, if subsequent brazing is done in the oven.

In addition to the foregoing, it is also advantageous that the spray nozzle 6, as well as the part 13 to be covered, be brought to different electrical potentials, for instance by means of electrostatic equipment 14, of the kind used in electrostatic paint plants. In this way, one is certain that all fluxing compound previously melted, at least partially, before reaching said part 13, is evenly distributed on it and that fluxing compound losses are at a strict minimum.

Another means of depositing the fluxing compound, also advantageous in particular in the preferred application of the invention to radiator brazing, consists of providing a receptacle in which the fluxing compound powder is kept in suspension in a gas continuously circulating, so that the powder suspension is uniform in said receptacle, and to pre-heat the part to be covered to a temperature of 300° to 450° C., so that the particles of powder in suspension in said receptacle and which come into contact with said part melt at least partially upon contact with the same, while covering it in an even manner.

The heating of the part can be effected before putting it in the receptacle, or into the receptacle itself, which can be done in various ways known in the technique, for example by submitting the part to an infra-red ray, or passing an electric current into it of sufficient intensity for bringing the temperature to the level stated above, or else by subjecting it to the action of high frequency current, etc.

When the powder is sprayed that has been brought to a melting point before reaching the part to be covered, obviously other appliances can be used than that of FIG. 1 and 2, and it is possible to suppress any flame by bringing a driving gas preheated to a sufficient temperature for partially melting the powder, or else, it is possible to use a plasma spray-gun or centrifugal cupels associated, or not, with heating members by radiation, conduction or the like.

When brazing is done in the oven, which is the preferred working method according to the invention, then the depositing of the fluxing compound on parts to be brazed, in this case a radiator core, is done immediately before introducing said cores into the oven, so that the deposited fluxing compound has not had time to hydrate, which enables an oven to be used in which it is not necessary to carry out a considerable preliminary dehydration of the air or other gas in it, as has been necessary up till now.

In the case of brazing radiator cores in an oven and operating the invention, it has been noticed that particularly satisfactory results were obtained by using extremely small quantities of fluxing compounds and taking care to proceed as follows:

After assembling, the core is subjected to cleaning, pickling, rinsing operations, by successively putting it into a de-greasing bath and one or more acid or alkaline pickling baths, then into a rinsing bath heated to about 90° C.

Actually, it has been noticed that the core was brought in a few seconds to ambient temperature, owing to its low heat inertia and that it dried spontaneously owing to the rapid evaporating of the hot rinsing solution. Seeing that also the core is at the ambient temperature in a very short time, the oxide coat, whose greater part is destroyed in said pickling bath, has not time to reform if the precaution is taken of subjecting said core to the fluxing compound deposit just after drying, this fluxing compound then forming a coat protecting the core during its preheating in the oven to which it is taken for brazing. The deposition according to the process described in the foregoing of the fluxing compound also has a considerable interest when the brazing of parts, in particular, radiator cores, must be done by plunging these parts into a melted salts bath according to the process currently used in the technique. Actually, seeing that the part to be brazed carries the necessary quantity of fluxing compound for proper brazing, then each part plunged into the brazing bath brings to the bath the necessary quantity of fluxing compound for effecting brazing. Consequently, the compounds contained in the bath are renewed by adding the fluxing compound brought by each part, and also, the quantity of fluxing compounds necessarily removed by each part after brazing, when withdrawn from the bath, is obviously also compensated by the quantity of fluxing compound brought by this part. Thus the bath remains at a steady level, eliminating the necessity of proceeding, as done up till now, to periodical new additions of fluxing compounds to the bath, these new contributions being delicate operations on account of the bath temperature and the precision of the composition of the products that it must always contain.

Also, this process has the advantage of bringing the parts to be brazed while having maintained the advantages of pickling, consisting of partially or totally eliminating the oxide coating, up to the brazing operation itself, thus enabling a less agressive flux to be used, which is consequently, generally cheaper.

When the parts to be brazed are not covered with a brazing alloy, a powdered anhydrous flux is prepared as described in the foregoing, and parallely, an aluminum-silicon alloy powder is prepared, the alloy containing 2 to 13 percent of silicon, this aluminum alloy powder being sifted so that its size composition is approximately 150 $\mu$.

The next operation of the process consists of mixing the aluminum powder with the powder of flux, the proportion of the mixture being about 2 to 5 parts by weight of flux powder for one part by weight of the metallic powder. The powder mixture thus prepared is used for supplying, as described in the foregoing, a spray-gun by which said powder is sprayed on the parts to be brazed.

When the spray-gun is at work, the brazing alloy is protected by the vaporizing of the finest particles of flux, and the brazing metal is made very adherent to parts on which it is sprayed, because this metal is sprayed at the same time as the flux in a liquid or pasty state, and since the impact force to which said metal is subjected strikes the portion of the parts to be covered.

Moreover, seeing that the brazing alloy has a much higher density than the flux in the liquid state with which it is sprayed, it has been noticed that the brazing alloy flows to the bottom part of the coat covering the parts, i.e., that it is covered by a coat of flux thus acting as a protecting coating as long as brazing itself has not been done.

To do brazing, the covered parts are placed in an oven where they are heated up to the brazing temperature according to the kind of brazing alloy, for instance often in the vicinity of 600° C.

In an alternative of the process described above, the brazing alloy is not reduced to powder but formed by a wire for supplying a spray-gun similar to that used in metallurgy, this spray gun then being further supplied with flux powder conveyed by an air jet or other compressed gases, so the particles of melted alloys and flux, also melted, are discharged at a sufficiently high speed so that they properly adhere to the part to be covered.

I claim:

1. A process for fluxing and brazing parts made of aluminum and aluminum alloys with a brazing alloy for assembling portions at least of the same, comprising the steps of:

preparing a brazing flux in an anhydrous form;
powdering said anhydrous flux;
hot spraying said powdered flux on said portions of parts to be brazed, said spraying being conducted at a temperature substantially equal to the melting temperature of said flux, whereby said flux is adhered to said portions of parts kept at ambient temperature; and
heating said parts to brazing temperature in the presence of said brazing alloy;
whereby the flux deposited is initially melted, and said brazing alloy is subsequently melted to braze said parts along said portions wetted by said melted flux.

2. A process as set forth in claim 1 wherein said flux is heated between 200° and 400° C by blowing compressed air with the powder of flux, then passing said powder contained in the compressed air through a flame of a burner, whereby flux is heated only during a very short time.

3. A process as set forth in claim 1, wherein said parts covered with hot sprayed flux is preheated toward the brazing temperature, then bathed in a melted flux bath heated at the brazing temperature, whereby said sprayed flux prevents oxidation during preheating and compensates loss of flux of said melted flux bath having a flux composition of light reactivity.

4. A process as set forth in claim 1, wherein said parts to be brazed are firstly submitted to pickling, to rinsing in hot water, to drying at ambient temperature, then to hot spraying fluxing immediately when dried, whereby said sprayed flux forms a protective layer preventing oxidation.

5. A process as set forth in claim 1 wherein said brazing alloy is powdered, then sprayed simultaneously with said flux at the same temperature as said flux, whereby said powdered alloy is rendered adherent to said part with said flux without being melted.

6. A process as set forth in claim 5, wherein said brazing alloy is reduced to fine powder of particle size about 150 $\mu$, and is mixed with the fluxing compound itself reduced to powder of size between 25 and 150 $\mu$, the proportion of brazing alloy being one part by weight for 2 to 5 parts by weight of fluxing compound.

* * * * *